United States Patent
Mydlack et al.

(10) Patent No.: US 8,119,051 B2
(45) Date of Patent: Feb. 21, 2012

(54) METHOD OF CASTING URETHANE FOR A GOLF BALL COVER

(75) Inventors: Thomas L. Mydlack, Rochester, MA (US); Thomas E. Moore, Warren, RI (US); Edmund T. Maher, Fairhaven, MA (US); Mark R. Verronneau, Acushnet, MA (US); Richard Westgate, Rochester, MA (US); Glenn R. Newell, Rochester, MA (US); Sharon P. Easton, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 295 days.

(21) Appl. No.: 12/614,814

(22) Filed: Nov. 9, 2009

(65) Prior Publication Data

US 2011/0109010 A1    May 12, 2011

(51) Int. Cl.
*B29C 39/10* (2006.01)
*B29C 39/26* (2006.01)

(52) U.S. Cl. ............... 264/275; 264/279.1; 264/297.5; 264/297.6; 264/297.7

(58) Field of Classification Search .................. None
See application file for complete search history.

(56) References Cited

U.S. PATENT DOCUMENTS

| | | | | |
|---|---|---|---|---|
| 2,117,400 A * | 5/1938 | Cobb | ............... | 425/116 |
| 3,112,521 A * | 12/1963 | Ward | ............... | 425/126.1 |
| 3,147,324 A | 9/1964 | Ward | | |
| 3,989,568 A | 11/1976 | Isaac | | |
| 4,389,365 A | 6/1983 | Kudriavetz | | |
| 4,573,902 A * | 3/1986 | Heilman et al. | ............... | 425/543 |
| 5,006,297 A | 4/1991 | Brown et al. | | |
| 5,334,673 A | 8/1994 | Wu | | |
| 5,688,191 A | 11/1997 | Cavallaro et al. | | |
| 5,692,974 A | 12/1997 | Wu et al. | | |
| 6,315,680 B1 | 11/2001 | Dalton et al. | | |
| 6,315,915 B1 | 11/2001 | Hebert et al. | | |
| 6,392,002 B1 | 5/2002 | Wu | | |
| 6,635,133 B1 | 10/2003 | Boehm et al. | | |
| 6,936,205 B2 | 8/2005 | Cavallaro et al. | | |
| 7,041,245 B1 * | 5/2006 | Calabria et al. | ............... | 264/135 |
| 7,135,136 B2 | 11/2006 | Puniello et al. | | |
| 7,246,937 B2 | 7/2007 | Verronneau et al. | | |
| 7,314,587 B2 | 1/2008 | Hebert et al. | | |
| 7,481,956 B2 | 1/2009 | Wu et al. | | |
| 7,490,975 B2 | 2/2009 | Puniello et al. | | |

* cited by examiner

*Primary Examiner* — Edmund H. Lee
(74) *Attorney, Agent, or Firm* — D. Michael Burns

(57) ABSTRACT

The present invention is directed relates to a method of applying a thin thermoset or thermoplastic cover over a golf ball subassembly by simultaneously dispensing polyurethane into multiple molds while using multiple mixers from multiple polyurethane sources. The method employs a continuous conveyor system wherein pre-heated first (top) and second (bottom) mold halves are pre-heated and pre-sorted prior to a polyurethane material being deposited in each mold half, preferably, each mold half comprises four cavities. A rotary table maneuvers the mold halves into position to receive a shot of polyurethane in each cavity. The polyurethane is dispensed from two separate mixers, each mixer having a pair of dispensing nozzles capable of shuttling back and forth between the cavities. To maintain process integrity, it is imperative that polyurethane dispensed into a particular top mold half and the polyurethane dispensed into the corresponding mated bottom mold half be from the same polyurethane mixer. The method of the invention provides a mechanism to maintain that the shot of polyurethane in each mold half is dispensed from the same mixer.

14 Claims, 1 Drawing Sheet

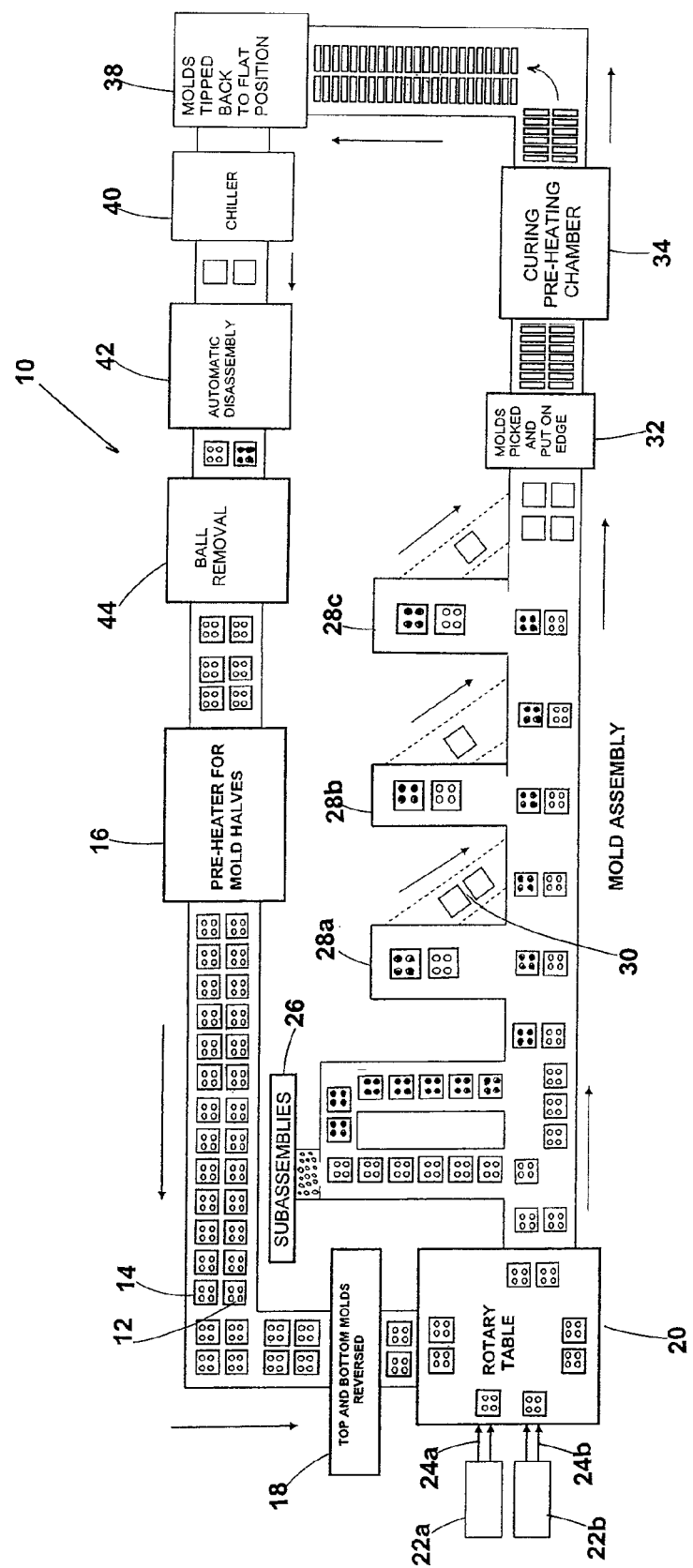

METHOD OF CASTING URETHANE FOR A GOLF BALL COVER

FIELD OF THE INVENTION

The present invention relates to golf balls, specifically, to a method of applying a cover over a golf ball subassembly. And more particularly, the simultaneous dispensing of urethane into multiple molds while using multiple, in-motion urethane mixers.

BACKGROUND OF THE INVENTION

Solid golf balls are usually two or more piece constructions. Two-piece golf balls include a single-piece core and a cover. A subassembly comprises a core and any layers that the cover surrounds. Three-piece golf balls include a core, an intermediate layer, and a cover. In such balls, the core and intermediate layer may form the golf ball subassembly that the cover surrounds.

For premium golf balls, the cover material typically comprises thermosetting polyurethane. One method of making polyurethane-covered golf balls includes disposing the golf ball subassembly into a cover mold and casting the cover thereon.

The use of urethane polymers has been proposed for golf ball cover compositions. One patent teaches of the initial forming of two urethane shell blanks to make cover halves (U.S. Pat. No. 3,989,568). Another patent suggests forming a smooth cover and thereafter impressing dimples in the smooth cover (U.S. Pat. No. 5,006,297). Still another patent describes a sequence of filling first half of a mold with urethane, inserting a ball center therein and later adding more urethane to a second half and uniting the second with the first half (U.S. Pat. No. 3,147,324). The basic principle of the '324 patent is still seen today, albeit many modifications having been made over the years to solve inherent process problems.

The present invention seeks to improve present day methods of making urethane covered golf balls by introducing new automation processes that increase product volume without increasing working area or manpower.

SUMMARY OF THE INVENTION

The present invention is directed to a method of making golf balls and, in particular, a method of automatically molding a thin layer of a thermoset or thermoplastic material around a subassembly component. The method employs a continuous conveyor system wherein pre-heated first (top) and second (bottom) mold halves are pre-heated and pre-sorted prior to a polyurethane material being deposited in each mold half. Preferably, each mold half comprises four cavities.

The invention provides for a rotary table which maneuvers the mold halves into position to receive a shot of polyurethane in each cavity. The uniqueness of this invention is that the polyurethane is dispensed from two separate mixers, each mixer having a pair of dispensing nozzles capable of shuttling back and forth between the cavities. To maintain process integrity, it is imperative that polyurethane dispensed into a particular top mold half and the polyurethane dispensed into the bottom mold half that it is mated to, be from the same polyurethane mixer. The method of the invention provides a mechanism to maintain that the shot of polyurethane in each mold half is dispensed from the same mixer.

The present invention provides for the pre-heating of the subassemblies prior to being deposited into the first mold half and the molds are automatically mated at a pressure of about 6,800 lbs of force per mold, or about 1,700 lbs of force per cavity, which translates to about 767 psi per cavity by a programmable electronically controlled rate of pressurization is applied. The assembly stations have the ability to assemble with pressures from 0 to 16,000 lbs of force per mold.

The method provides for greater efficiency of conveyor space and better thermodynamics by flipping the mold halves into a vertical position for the curing stage of the process. After the curing and subsequent chilling the molds are automatically disassembled and the golf balls are de-molded for processing to the next stage where they will be buffed, painted and pad printed.

BRIEF DESCRIPTION OF THE DRAWING

FIG. 1 is a flow schematic of the turbo casting line.

DETAILED DESCRIPTION OF THE INVENTION

A method of the present invention can be used to make a golf ball which is comprised of a golf ball subassembly surrounded by a cover layer. The cover layer forms the outer surface of the ball and has dimples defined therein. The golf ball subassembly includes a core and at least one intermediate layer.

Although the golf balls disclosed herein have solid cores, the present invention can also be used with fluid-filled cores or wound cores. The fluid within the core can be a wide variety of materials including air, water solutions, liquids, gels, foams, hot-melts, other fluid materials and combinations thereof, as known by those of ordinary skill in the art.

The intermediate layer (i.e. mantle layer) can be formed by molding a material over a conventional core, and there can be more than one intermediate layer. The molding techniques used to form the intermediate layer can be those such as injection molding or compression molding.

For simplicity, the present invention is particularly directed towards a method of casting a cover layer over a subassembly that includes a core and layer(s) about the core. The thickness of the cover layer is critical to the "progressive performance" of the golf balls of the present invention. If the outer cover layer is too thick, this cover layer will contribute to the in-flight characteristics related to the overall construction of the ball and not the cover surface properties. However, if the outer cover layer is too thin, it will not be durable enough to withstand repeated impacts by the golfer's clubs. Specifically, it has been determined that the cover layer must have a thickness of less than about 0.05 inches, preferably between about 0.02 and about 0.04 inches. Most preferably, this thickness is about 0.03 inches.

The cover layer is formed from a relatively soft thermoset material in order to replicate the soft feel and high spin play characteristics of a balata ball when the balls of the present invention are used for pitch and other "short game" shots. In particular, the cover layer should have a Shore D hardness of from about 30 to about 60, preferably 35-50 and most preferably 40-45. Additionally, the materials of the cover layer must have a degree of abrasion resistance in order to be suitable for use as a golf ball cover.

The cover layer of the present invention can comprise any suitable thermoset material which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in U.S. Pat. No. 5,692,974, entitled "Golf Ball Covers", the disclosure of which is hereby incorporated by reference in its entirety in the present application.

Thermoset polyurethanes and urethanes are particularly preferred for the cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N',N'-tetrakis (2-hydroxypropyl)ethylenediamine. However, the present invention is not limited to just these specific types of thermoset polyurethanes. Quite to the contrary, any suitable thermoset polyurethane may be employed to form the cover layer of the present invention.

The subassemblies of the present invention comprise golf ball cores and the surrounding layer(s) which may comprise any of a variety of constructions. For example, the subassembly of the golf ball may comprise a conventional core surrounded by an intermediate layer disposed between the core and an inner cover layer, often referred to as a mantle layer. The innermost portion of the core may be solid or it may be a liquid filled sphere. The core may also comprise a solid or liquid filled center around which many yards of a stretched elastic thread or yarn are wound.

The cores can be formed by conventional techniques such as disclosed in U.S. Pat. No. 4,389,365 issued to Kudriavetz, which is incorporated herein by reference in its entirety. Preferably, the cores are formed of compositions having a rubber base material, an initiator, crosslinking agents, a filler and a co-crosslinking agent. The rubber base material is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agents includes a metal salt of an unsaturated fatty acid such as sodium, zinc, lithium or magnesium salt or an unsaturated fatty acid having 3 to 8 carbon atoms such as acrylic or methacrylic acid. Preferably, zinc diacrylate and peroxide are used in these cores. The filler typically includes materials such as zinc oxide, barium sulfate, silica, calcium carbonate, zinc carbonate, regrind, or any powdered metal such as tungsten, and the like.

Other ingredients such as accelerators, e.g. tetra methylthiuram, processing aids, processing oils, plasticizers, dyes and pigments, as well as other additives well known to one of ordinary skill in the art may also be used in the present invention in amounts sufficient to achieve the purpose for which they are typically used.

Generally, all of the ingredients except the initiator are combined. When a set of predetermined conditions is met, i.e., time and temperature of mixing, the initiator is added to the other ingredients in an amount dependent upon the amounts and relative ratios of the starting components, as would be well understood by one of ordinary skill in the art.

After completion of the mixing, the golf ball core composition is milled and hand prepped or extruded into pieces ("preps") suitable for molding. The milled preps are then compression molded into cores at an elevated temperature. Typically, about 335° F. for about 15 minutes is suitable for this purpose.

Other suitable materials for the cores include thermosets, such as rubber, polyisoprene; thermoplastics such as ionomer resins, polyamides or polyesters; or a thermoplastic elastomer. Suitable thermoplastic elastomers include but are not limited to Pebax®, Hytrel® thermoplastic urethane, and Kraton®, which are commercially available from Elf-Atochem, DuPont, various manufacturers, and Shell, respectively. Blends of these thermoplastic elastomers can also be used. The core material can also be formed from a castable or reaction injection moldable material. Suitable castable materials include, but are not limited to urethane, polyurea, epoxy, and silicone. The core can also be fluid-filled center with or without windings or solid-center wound core.

The intermediate layer(s) that surround the core to make up the subassembly, can be formed by joining two hemispherical cups of material in a compression mold or by injection molding, as known by one of ordinary skill in the art. The intermediate layer may be a thermoplastic or a thermoset material. For example, a recommended ionomer resin material is SURLYN® and a recommended thermoplastic copolyetherester is Hytrel®, which are commercially available from DuPont. Blends of these materials can also be used. Another example of a suitable intermediate layer material is a thermoplastic elastomer, such as described in U.S. Pat. Nos. 6,315,680 and 5,688,191, which are both incorporated herein by reference in their entireties.

Prior to the subassembly being introduced into the system of the present invention, it is cooled so that it undergoes a volumetric reduction. Preferably, the subassembly volume after the volumetric reduction is at least about 1% of the golf ball subassembly initial volume.

Prior to the forming of the cover layer, the subassembly may be surface treated to increase the adhesion between the outer surface of the subassembly and the cover. Examples of such surface treatment may include mechanically or chemically abrading the outer surface of the subassembly. Additionally, the subassembly may be heated by a corona discharge or plasma treatment prior to forming the cover around it. Other layers of the ball also may be surface treated. Examples of these and other surface treatment techniques can be found in U.S. Pat. No. 6,315,915, which is incorporated by-reference in its entirety.

The overall outer diameter (OD) of the subassembly (including the core and any intermediate mantle layer(s) or windings) of the present invention is about 1.580 inches to about 1.640 inches, preferably about 1.60 inches to about 1.630 inches, and most preferably about 1.620 inches.

The present multilayer golf ball can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The subassemblies of the golf balls of the present invention can be made by any conventional process employed in the golf ball art. For example, the solid centers can be either injection or compression molded. Similarly, the wound centers employed in the present invention can be produced through conventional means. The mantle layer(s) are subsequently injection or compression molded about the core.

However, due to the very thin nature (less than 0.05"), it is not practical to form the outer cover layers of the ball of the present invention using conventional injection or compression molding techniques ordinarily employed in the golf ball art for applying cover materials. These conventional ball molding processes are not capable of easily applying such thin outer cover layers over a solid spherical surface.

Accordingly, it has been found that the use of a castable, reactive material which is applied in a fluid form makes it possible to obtain very thin outer cover layers on golf balls. Specifically, it has been found that castable, reactive liquids which react to form a thermoset material provide desirable very thin outer cover layers.

The cover material used in the present method is polyurethane which is the product of a reaction between a polyurethane prepolymer and a curing agent. To start the cover formation, mixing of the prepolymer and curative is accomplished in motorized mixer by feeding through lines metered amounts of curative and prepolymer. Similarly, U.S. Pat. No. 5,006,297 to Brown et al. and U.S. Pat. No. 5,334,673 to Wu both also disclose suitable coating techniques which may be utilized to apply the castable reactive liquids employed in the present invention. The disclosures of these patents are hereby incorporated by reference in their entirety. However, the method of the invention is not limited to the use of these techniques.

The flow schematic of FIG. 1, depicts the method of the present invention for casting a thin urethane cover over a golf ball subassembly and includes steps which will now be discussed.

The method of the present invention requires a conveyor system 10 that is automated to operate continuously. First and second mold halves 12, 14, also referred to as top and bottom mold halves respectively, are pre-heated to about 140 to 165° F., preferably about 160° F. in a pre-heater 16. The mold halves have multiple hemispherical cavities, preferably four, and each cavity having reversed dimple patterns defined in the inner surface.

Prior to the mold halves 12, 14 being placed into position for the dispensing of a shot of polyurethane into the cavities, a pick and place mechanism 18 in the line reverses the position of every alternate pair of mold halves, for reasons to be explained later. Subsequently, the mold halves 12, 14 are moved onto a rotary table 20 which rotates the mold halves into position whereby they may receive a shot of urethane from a pair of dual mixers 22a and 22b and then rotates them for further processing. Each mixer 22a and 22b has a pair of dispensing nozzles 24a and 24b that simultaneously place a shot of urethane in the mold cavities by shuttling the nozzles to and fro from the inside and outside cavities of each mold. These nozzles are disclosed in U.S. Pat. No. 7,246,937 issued to Verronneau et al., which is incorporated herein by reference in its entirety. Since two molds are dispensed simultaneously by different mixers, it is imperative that the system maneuvers the mold halves in such a manner that it is assured that polyurethane that is dispensed into every top mold is from the same mixer that dispensed the polyurethane into the mated bottom mold.

The next step in the present method is moving the first (top) mold halves off the main conveyor line and into position for each to receive a subassembly (core and intermediate layer (s)) which have been treated with a corona charge before being deposited into the top mold cavity. After receiving a subassembly from the subassembly supply 26 the first mold half is matched on the conveyor line with a second (bottom) mold half. The function of the pick and place mechanism 18 assures that the integrity of the process is maintained by making sure that the urethane deposited in matching mold halves comes from the same mixer, whether that be 22a or 22b.

The present method utilizes two centering heads in a pass-thru design wherein three assembly head stations 28a, 28b and 28c incorporate concentric assembly pressure (CAP) features that are designed into each station resulting in a better parting line with a cleaner cut-off and more uniform overflow enhancing the uniformity of the molded ball. Additionally, each assembly station is equipped with an air-over-oil cylinder controlled by an E to P pressure regulator in concert with both a pressure sensor and LVDT displacement sensor resulting in a programmable electronically controlled rate of pressurization. The mold halves are clamped together under a pressure of about 6,800 lbs of force per mold (about 1,700 lbs of force per cavity, which translates to about 767 psi per cavity) by a programmable electronically controlled rate of pressurization is applied. The assembly stations have the ability to assemble with pressures from 0 to 16,000 lbs of force per mold. The halves are clamped by bolts, however other suitable means for clamping are possible. After being assembled, the molds in concert with the centering design are introduced back onto the main conveyor.

Prior to being introduced into a curing and preheating chamber 34, automated flippers 32 orient the molds 30 into a vertical position wherein the system may maximize the use of conveyor space and also achieve a higher degree of curing thermodynamics. While in the chamber 34 the molds are cured first by two separate curing passes and then are pre-cooled on a meshed conveyor belt to allow directed air flow evenly over both mold halves simultaneously. The molds are then passed into a tipping station 38 wherein they are tipped back to a horizontal plane for passage through a high efficiency chiller 40 equipped with zone control of fans.

After the molds 30 have been chilled the balls are de-molded by an automated in-line disassembly machine 42 and then moved to a ball removal machine 44 which automatically picks the golf balls out of the cavities for further processing which includes buffing, painting and pad printing (not shown).

While various descriptions of the present invention are described above, it is understood that the various features of the embodiments of the present invention shown herein can be used singly or in combination thereof. This invention is also not to be limited to the specifically preferred embodiments depicted therein.

What is claimed is:

1. A method of manufacturing a cover for a golf ball, comprising the following steps in the sequence set forth:
   providing a continuous conveyor system;
   providing pre-heated first and second mold halves, each mold half comprising at least one cavity;
   providing a pair of mixers to supply cover material to the first and second mold halves, each mixer having a dispensing apparatus that contains dual dispensing nozzles;
   providing a rotary table with a mechanism for presenting the first and second mold halves to the dual dispensing nozzles whereby a shot of the cover material is dispensed from each nozzle into each of the at least one cavity such that when the mold halves are mated all the cover material in each mold half is from the same dispensing nozzle; then
   depositing molded golf ball subassemblies into the cover material of the first mold half; then automatically mating the first and second mold halves by applying a programmable electronically controlled rate to mold a cover over each golf ball subassembly to form a golf ball; then flipping each mated mold into a vertical position for greater space utilization and better thermodynamic processing thereof; subsequently curing the cover of each golf ball in the mated mold halves; then pre-cooling the cover; then chilling the cover; then disassembling the molds; and removing each golf ball from the system by an automatic robotic device for further finishing, painting and pad printing.

2. The method of claim 1, wherein each mold half consists of four cavities.

3. The method of claim 1, wherein each mold half is pre-heated to about 140 to 165° F.

4. The method of claim 1, wherein the pre-cooling of the molds is on a meshed conveyor belt to allow directed air flow evenly over both halves of mold simultaneously.

5. The method of claim 1, wherein the cover is formed from a thermoset material having a shore D hardness in the range of about 30 to about 60.

6. The method of claim 5, wherein the cover has a shore D hardness in the range of about 35 to about 50.

7. The method of claim 6, wherein the cover has a shore D hardness in the range of about 40 to about 45.

8. The method of claim 5, wherein the themoset material comprises at least one of a thermoset urethane, a polyurethane, a thermoset urethane ionomer, or a thermoset urethane epoxy.

9. The method of claim 5, wherein the cover is formed from a urea.

10. The method of claim 1, wherein the cover thickness is from about 0.02 to about 0.04 inches thick.

11. The method of claim 1, wherein the golf ball subassemblies, prior to being deposited into the first mold halves, are subjected to a surface treatment by corona discharge, plasma treatment, or a combination thereof.

12. The method of claim 1, wherein each subassembly has a temperature of about 120° to about 130° F.

13. The method of claim 12, wherein each subassembly has a temperature of about 125° F.

14. The method of claim 1, wherein the dual nozzles shuttle back and forth between the mold cavities to dispense the shot of cover material into each cavity.

* * * * *